United States Patent
Krishnan et al.

[11] Patent Number: 6,153,685
[45] Date of Patent: Nov. 28, 2000

[54] MELT-STABLE PIGMENTED POLYCARBONATE MOLDING COMPOSITION

[75] Inventors: Sivaram Krishnan; James B. Johnson, both of Pittsburgh, Pa.

[73] Assignee: Bayer Corporation, Pittsburgh, Pa.

[21] Appl. No.: 09/158,859

[22] Filed: Sep. 23, 1998

[51] Int. Cl.[7] ............................... C08L 69/00; C08K 3/22
[52] U.S. Cl. ............................ 524/508; 524/95; 525/146
[58] Field of Search ....................... 524/95, 508; 525/146

[56] References Cited

U.S. PATENT DOCUMENTS

| | | | |
|---|---|---|---|
| 4,590,241 | 5/1986 | Hohlfeld | 525/132 |
| 4,895,897 | 1/1990 | Kaufman | 525/67 |
| 5,055,523 | 10/1991 | Inoue . | |
| 5,274,034 | 12/1993 | Morgan et al. | 525/67 |
| 5,756,621 | 5/1998 | Rösch et al. | 526/260 |
| 5,849,820 | 12/1998 | Kim . | |

FOREIGN PATENT DOCUMENTS

| | | |
|---|---|---|
| 261860 | 10/1990 | Japan . |
| 7758 | 1/1991 | Japan . |

*Primary Examiner*—David J. Buttner
*Attorney, Agent, or Firm*—Joseph C. Gil; Aron Preis

[57] ABSTRACT

A thermoplastic composition featuring an improved resistance to thermally induced resin degradation is disclosed. The composition comprises (i) thermoplastic polycarbonate resin (ii) about 3 to 20 percent, relative to the total weight of (i) and (ii), of titanium dioxide, and (iii) an oligomer or polymer the structure of which features at least one pendant cyclic iminoether group per molecular chain. The amount of (iii) is that which is sufficient to improve the resistance of the composition to thermal degradation.

5 Claims, No Drawings

MELT-STABLE PIGMENTED POLYCARBONATE MOLDING COMPOSITION

FIELD OF THE INVENTION

The invention relates to thermoplastic molding compositions and more particularly to molding compositions that contain pigments or dyes.

SUMMARY OF THE DISCLOSURE

A thermoplastic composition featuring an improved resistance to thermally induced resin degradation is disclosed. The composition comprises (i) thermoplastic polycarbonate resin (ii) about 3 to 20 percent, relative to the total weight of (i) and (ii), of titanium dioxide, and (iii) an oligomer or polymer the structure of which features at least one pendant cyclic iminoether group per molecular chain. The amount of (iii) is that which is sufficient to improve the resistance of the composition to thermal degradation.

TECHNOLOGICAL BACKGROUND

Color concentrates are well known in the art. These blends which contain a relatively high concentration of a functional additive may be used advantageously in admixture with, for instance, virgin resin or with virgin blends in preparing molding compositions containing effective amounts of the functional additive.

Molders use color concentrates as means to minimizing inventory of pre-colored materials. Use of concentrates also provided for ease in handling, and maintaining cleanliness in work areas. For example, a molder requiring a large number of compositions differing in their color, may inventory lower volumes of each of these in the form of color concentrates and dilute them as needed with natural resins at the molding or extrusion machines to produce colored articles. Color concentrates containing 10 to 20% of the pigment are common in the industry. Titanium dioxide is a known pigment that is often useful in making white or opaque articles. Color concentrates containing polycarbonate resin and a high loading of titanium dioxide are therefore useful and desirable. Unfortunately, degradation of polycarbonate resin often results in the course of processing of such concentrates. There is a need in providing polycarbonate/titanium dioxide concentrates, which will offer greater resistance to thermal degradation. While the present inventors can not confirm it, a suggestion has been made that the degradation is a consequence of a reaction between the polycarbonate resin and impurities commonly present in commercial titanium dioxide pigments.

The present invention resides in the findings that polycarbonate color concentrates that contain a high loading of titanium dioxide are rendered more resistant to thermal degradation by the incorporation of a stabilizing amount of an additive, the structure of which contains cyclic iminoether groups.

The efficacy of oxazoline-containing additives in the context of polymeric resins, including polycarbonates, has been previously disclosed. Among the relevant documents, mention may be made of U.S. Pat. No. 4,895,897, which disclosed a polycarbonate containing thermoplastic molding composition having improved impact performance. The composition contains a functionalized elastomer which is the reaction product of (i) an ethylene elastomer having at least one reactive polar group and (ii) oxazoline-functionalized polystyrene. Surfaces with high gloss are said in U.S. Pat. No. 5,274,034 to characterize parts molded from a polycarbonate composition. This composition also contains aromatic polycarbonate with reactive carboxylic acid group and styrene-based polymer with repeating units containing pendant cyclic iminoether groups. The polymers and oligomers of olefinically unsaturated hydrocarbons containing oxazolinyl end groups have been disclosed in U.S. Pat. No. 5,756,621 for their utility as compatibilizers in polymer blends. Also relevant is U.S. Pat. No. 4,590,241, which disclosed a compatible blend of thermoplastic resins. The blend contains a reactive polymer having repeating units containing pendant cyclic iminoether groups. That polymer is reacted, to form a linkage and a compatible blend, with a thermoplastic polymer containing a co-reactive group.

DETAILED DESCRIPTION OF THE INVENTION

The stabilized composition in accordance with the present invention comprises (i) thermoplastic polycarbonate resin
(ii) about 3 to 20, preferably about 5 to 20, more preferably 10 to 20 percent, relative to the total weight of (i) and (ii), of titanium dioxide, and
(iii) an amount of an oligomer or polymer the structure of which features at least one pendant cyclic iminoether, preferably oxazoline, group per molecular chain, sufficient to improve the resistance of the composition to thermal degradation. The improvement is in comparison to a composition from which said (iii) is excluded.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 24 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, New York, 1964, all incorporated herein by reference).

In the present context, dihydroxy compounds suitable for the preparation of the polycarbonates of the invention conform to the structural formulae (1) or (2).

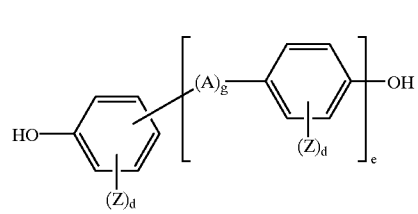

(1)

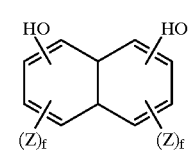

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

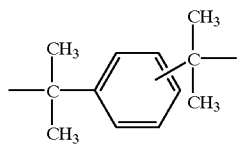

e and g both denote the number 0 to 1;

Z denotes F, Cl, Br or Cl—C$_4$-alkyl and if several Z radicals are substituents in one aryl radical, they may be identical or different from one another;

d denotes an integer from 0 to 4; and f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α,α-bis-(hydroxyphenyl)-diisopropyl-benzenes, as well as their nuclear-alkylated compounds. These and further suitable aromatic dihydroxy compounds are described, for example, in U.S. Pat. Nos. 5,227,458, 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl4-hydroxy-phenyl)-sulfoxide, bis-(3,5-dimethyl-4-hydroxyphenyl)-sulfone, dihydroxy-benzophenone, 2,4-bis-(3,5-d imethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein-small quantities, e.g., 0.05 to 2.0 mol % (relative to the bisphenols) of polyhydroxy compounds.

Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxy compounds which may be used for this purpose: phloroglucinol; 4,6-dimethyl-2,4,6-tri-(4-hydroxy-phenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)4-methyl-phenol; 2,4-dihydroxybenzoic acid; 2-(4-hydroxyphenyl)-2-(2,4-dihydroxy-phenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pennsylvania.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

Titanium dioxide in particulate form is a pigment, which is well known to the art-skilled. It has been widely used as such in molding compositions and it is readily available in commerce.

The stabilizer suitable in the context of the invention is an oligomer or polymer which melts at a temperature equal to or lower than the melt temperature of polycarbonate, and is capable of being compounded with polycarbonate resin in the molten state, the structure of which features at least one pendant cyclic iminoether, preferably oxazoline, group per molecular chain. Such compounds are known and are readily available in commerce. Preparation of suitable stabilizers has been disclosed in, for instance, U.S. Pat. Nos. 3,505,297 and 5,756,621, the specifications of which are incorporated herein by reference.

The stabilizer of the invention is required to contain in its structure an amount of cyclic iminoether groups sufficient to improve the resistance of the composition against thermal degradation, such as is evidenced by a decrease in the molecular weight of the polycarbonate resin. More typically, it is required to contain about 0.01 to 10, preferably 0.1 to 5, percent by weight of units containing pendant cyclic iminoether groups.

The cyclic iminoether groups are advantageously described by the general structure

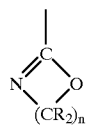

wherein each R is independently hydrogen, or an inertly substituted hydrocarbon containing 18 or fewer carbon atoms; and n is a number from about 1 to about 5. Said cyclic iminoether group can be attached to the polymer chains through any of the carbon atoms in the ring. Preferably, the cyclic iminoether is a 2-iminoether, i.e., is attached to the polymer chain through the 2-carbon atom to yield a structure as represented as

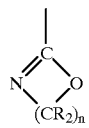

wherein R and n are as defined hereinbefore. Preferably, each R is hydrogen or lower alkyl and n is 1, 2 or 3. Most preferably, each R is hydrogen, n is 2 and the cyclic iminoether is a 2-oxazoline group. By "inertly substituted", it is meant that the referenced group contains no functional group which interferes with the polymerization or curing of the oxazoline group.

Polymers containing repeating units having pendant cyclic iminoether groups are advantageously prepared by the polymerization of a monomer mixture comprising an ethylenically unsaturated monomer containing a cyclic iminoether group. Preferably, such a monomer is a 2-alkenyl-2-oxazoline wherein said alkenyl group contains from about 2 to about 8, preferably 2 to 4 carbon atoms. Most preferably, said monomer is $^2$-isopropenyl-2-oxazoline.

The first reactive polymer is a polymer of any monomer, which (a) can be modified to contain pendant cyclic iminoether groups, or (b) can be copolymerized with a monomer, which contains or can be modified to contain a pendant cyclic iminoether group. In the preferred embodiment, wherein an ethylenically unsaturated cyclic iminoether is employed as a monomer, the first reactive polymer is advantageously a polymer of an additional polymerizable monomer copolymerizable therewith.

Said first reactive polymer is advantageously a polymer of a lower alkene, particularly a $C_1$–$C_8$-alkene, more particularly, ethylene or propylene as well as copolymers thereof; a conjugated diene such as butadiene or isoprene as well as copolymers thereof; vinyl acetate; an ether of an α,β-ethylenically unsaturated carboxylic acid such as alkyl esters of acrylic or methyl acrylic acid and copolymers thereof; a monovinylidene aromatic compound such as styrene, vinyltoluene, t-butyl styrene, vinylnaphthalene and the like; as well as polymers of diverse other addition polymerizable monomers. Ethylenically unsaturated cyclic iminoethers, in particular 2-alkenyl-2-oxazolines, generally resemble styrene in their polymerization reactions. Accordingly, as a rule of thumb, polymers of monomers, which are copolymerizable with styrene, will generally be usefully employed herein.

A particularly useful stabilizer in accordance with the invention is represented by the following structural formulas:

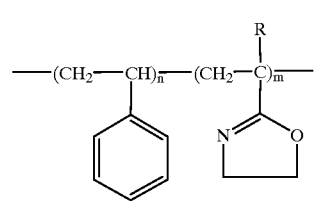

A

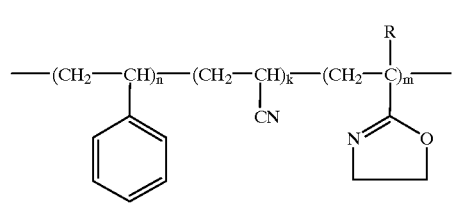

B where R is hydrogen, $C_3$–$C_8$ alkyl, $C_5$–$C_{10}$ cycloalkyl or an aryl group, preferably a methyl group; k, n and m are selected such that the oxazoline group constitutes about 1 to 15%, preferably 2 to 7% by weight relative to the weight of the stabilizer; and where the weight average molecular weight of the stabilizer is about 500 to 200,000, preferably 50,000 to 150,000.

Examples of the preferred embodiments entail a member selected from the group consisting of styrene/2-isopropenyl-2-oxazoline copolymer and acrylonitrile/2-isopropenyl-2-oxazoline/styrene terpolymer.

The stabilizer useful in the inventive composition is added in an amount sufficient to improve the resistance of the polycarbonate resin to thermal degradation, the improvement set in comparison to the resistance of a corresponding polycarbonate composition from which the stabilizer is excluded. Preferably, the stabilizer is present in an amount of 0.1 to 15%, preferably 0.5 to 10% relative to the weight of the titanium dioxide present in the composition.

The improved stabilization characteristic of the inventive composition may be determined by measuring the increase in its melt flow rate (MFR). Advantageously, MFR may be determined in accordance with ASTM D-1238 under the conditions stated in the table below. Stabilized compositions have a lower MFR than do corresponding, un-stabilized compositions under similar thermal conditions.

The stabilized compositions of the invention may contain other conventional additives for their art-recognized functions. These include dyes, other pigments, reinforcing agents and fillers, flame-retardants and hydrolysis and UV stabilizers, plasticizers and mold release agents.

The preparation of the stabilized compositions of the invention is conventional.

The invention is further illustrated but is not intended to be limited by the following examples in which all parts and percentages are by weight unless otherwise specified.

EXAMPLES

Stabilized compositions in accordance with the invention have been prepared and their properties determined. The table below provides a summary of the makeup of the compositions and their properties.

The polycarbonate used in Examples A, B, C, D and G was Makrolon 2608 homopolycarbonate based on Bisphenol A, a product of Bayer Corporation, having a MFR of about 11.8 gm/10 minutes. In Examples E, F and H, the polycarbonate was Makrolon 2458 MFR of about 20 gm/10 min).

The stabilizer used in Examples C and G was styrene/2-isoprenyl oxazoline copolymer having a weight average molecular weight of 150,000 and containing about 5% oxazoline. In Examples D and H, the stabilizer was styrene/acrylonitrile (about 70/30)/2-isoproprenyl oxazoline having a weight average molecular weight of about 50,000 and an oxazoline content of 5% by weight.

The MFR values on molded parts were determined on parts molded at the indicated temperature.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A thermoplastic composition comprising
   (i) thermoplastic polycarbonate resin,
   (ii) about 3 to 20 percent, relative to the total weight of (i) and (ii), of titanium dioxide, and
   (iii) 0.5 to 10 percent, relative to the weight of titanium dioxide, of an oligomer or polymer the structure of which features at least one pendant cyclic iminoether group per molecular chain, sufficient to improve the resistance of the composition to thermal degradation said polycarbonate being a product of a diphasic interface process from phosgene and at least one dihydroxy compound.

2. The composition of claim 1 wherein said (ii) is present in an amount of about 5 to 20 percent.

3. The composition of claim 1 wherein said (ii) is present in an amount of 10 to 20 percent.

4. The composition of claim 1 wherein (iii) is at least one member selected from the group consisting of styrene/2-isoprenyl-2-oxazoline copolymer and acrylonitrile/2-isoprenyl-2-oxazoline/styrene terpolymer.

5. A thermoplastic composition comprising
   (i) thermoplastic polycarbonate resin,
   (ii) about 3 to 20 percent, relative to the total weight of (i) and (ii), of titanium dioxide, and

|  | A | B | C | D | E | F | G | H |
|---|---|---|---|---|---|---|---|---|
| Polycarbonate 1* | 100 | 83.26 | 83.26 | 83.26 |  |  | 85.57 |  |
| Polycarbonate 2* |  |  |  |  | 100 | 85.57 |  |  |
| Titanium dioxide (TiO$_2$) |  | 16.74 | 16.74 | 16.74 |  | 14.43 | 14.43 | 14.43 |
| Stabilizer A* |  |  | 1.674 |  |  |  | 1.443 |  |
| Stabilizer B* |  |  |  | 1.674 |  |  |  | 1.443 |
| TiO$_2$/added stabilizer ratio |  |  | 10 | 10 |  |  | 10 | 10 |
| **Melt Flow Rate @ g/10 min. |  |  |  |  |  |  |  |  |
| Pellets | 11.8 | 57.2 | 11.2 | 14.3 | 19.9 | 37.9 | 11.8 | 19.9 |
| Parts |  |  |  |  |  |  |  |  |
| molded @ 550° F. | 12.0 | 63.9 | 12.6 | 18.2 | 20.1 | 42.8 | 14.2 | 23.4 |
| molded @ 600° F. | 12.2 | 68.3 | 13.7 | 25.5 | 20.2 | 48.0 | 14.2 | 28.5 |
| molded @ 650° F. | 12.2 | 113.5 | 16.1 | 33.6 | 20.4 | 59.8 | 16.6 | 31.2 |

*amount in parts by weight
Polycarbonate 2 = Makrolon 2405
**per ASTM D1238 @ 300° C., 1.2 kg load
Stabilizer A = Styrene-oxazoline Copolymer
Polycarbonate 1 = Makrolon 2608
Stabilizer B = Styrene-acrylonitrile-oxazoline terpolymer The results clearly show the improved resistance to thermal degradation imparted the composition by the inclusion of the stabilizer of the invention. In comparison to the unstabilized compositions, A and D, the concentrates of the invention show a constancy of its melt flow rates. This behavior is indicative of the greater resistance to thermal degradation.

(iii) 0.5 to 10 percent, relative to the weight of titanium dioxide, of an oligomer or polymer the structure of which features at least one pendant cyclic iminoether group per molecular chain, sufficient to improve the resistance of the composition to thermal degradation.

* * * * *